March 13, 1956 — D. I. TROXEL — 2,738,462
DIRECT COMPARISON HARMONIC CALIBRATOR
Filed July 17, 1951 — 2 Sheets-Sheet 1
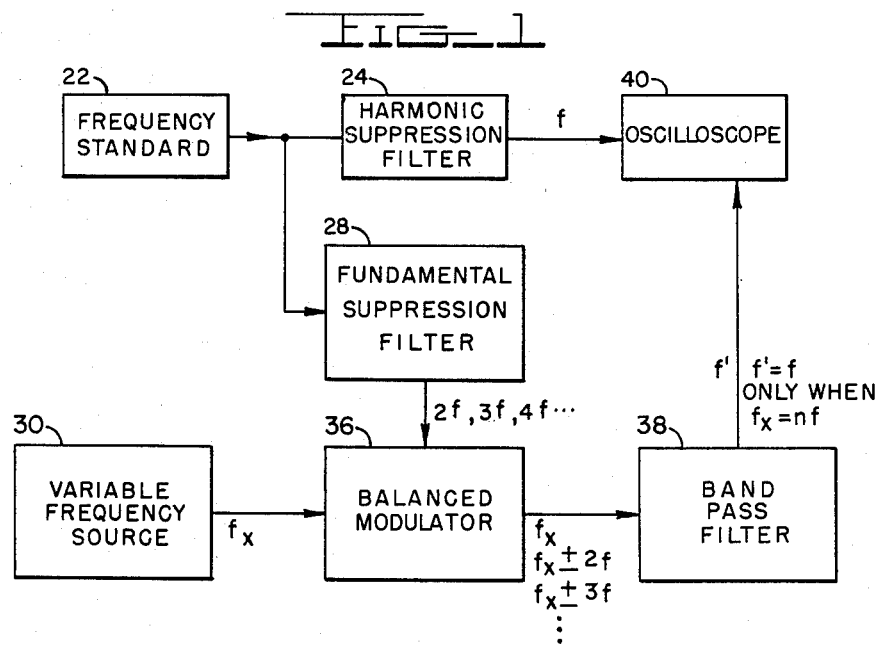
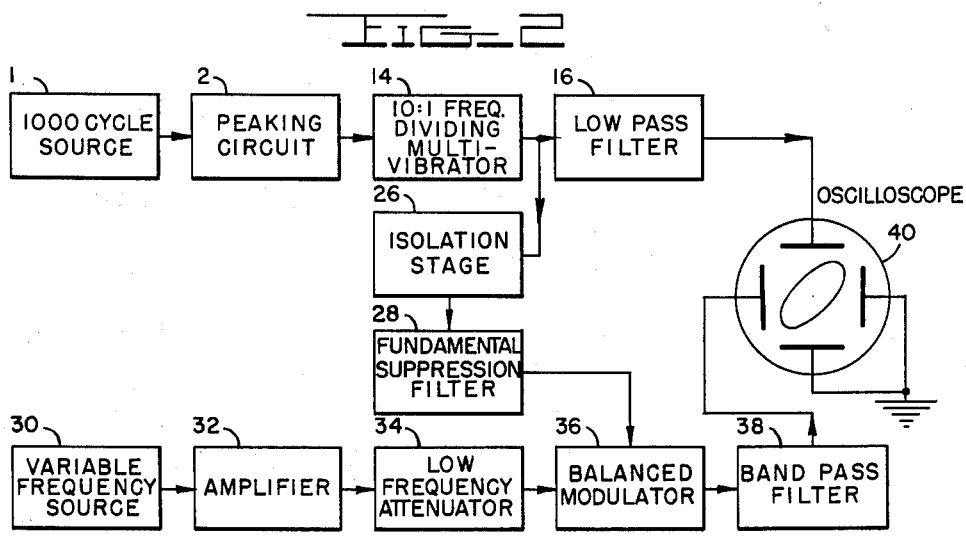
INVENTOR
DAVID I. TROXEL
BY
ATTORNEYS

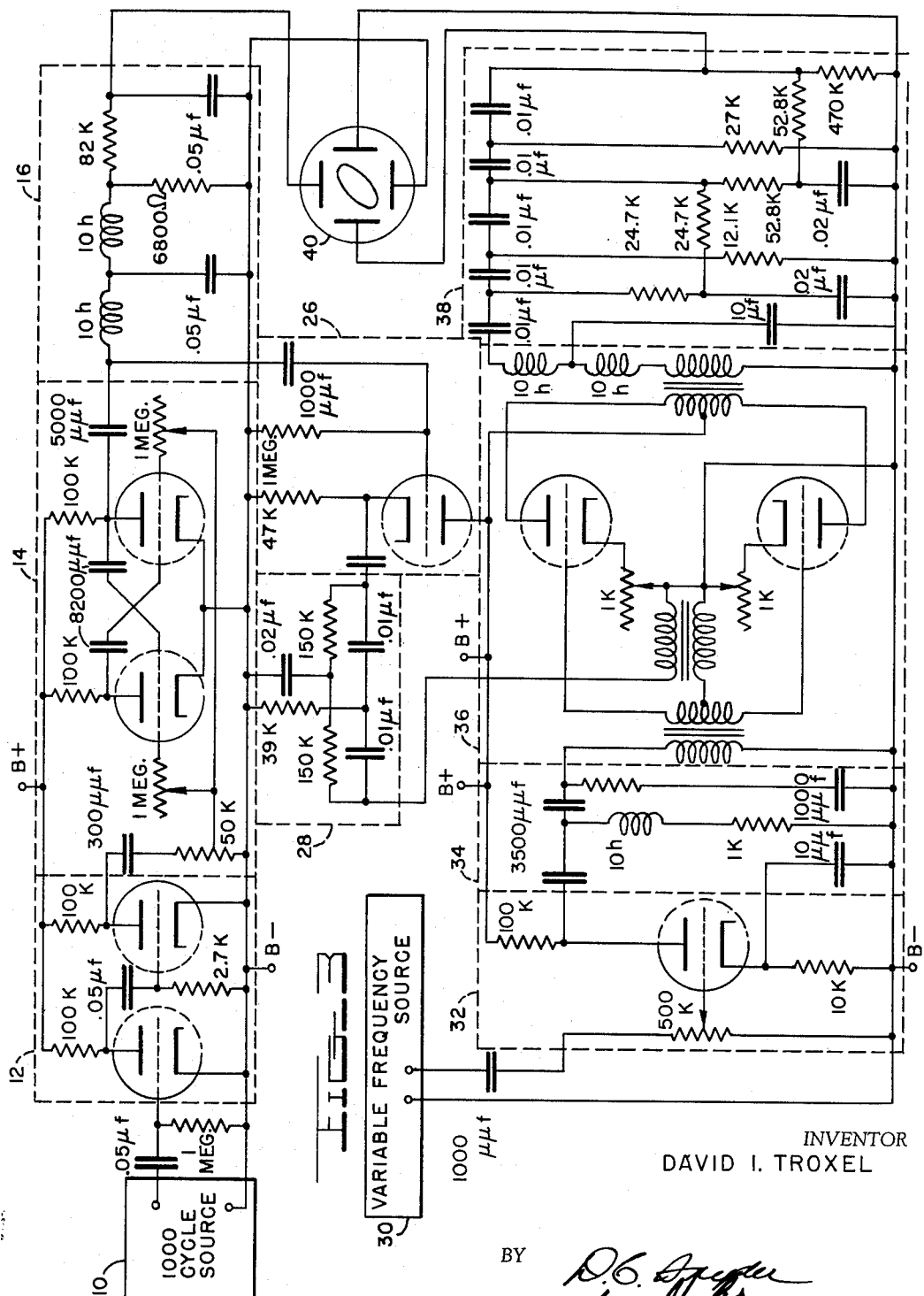

2,738,462
DIRECT COMPARISON HARMONIC CALIBRATOR

David I. Troxel, Washington, D. C.

Application July 17, 1951, Serial No. 237,272

12 Claims. (Cl. 324—79)

(Granted under Title 35, U. S. Code (1952), sec. 266)

This invention relates to a precise frequency calibration device for use with electronic equipment and in particular to a calibration device capable of application over any region of the frequency spectrum.

Accurate frequency measurements and equipment calibrations are usually made by comparing the equipment to be calibrated with some standard either by means of oscilloscope Lissajous patterns, or through zero-beat methods. While zero-beat methods are quite simple to use, it is possible, through the use of the Lissajous pattern technique, to obtain greater accuracy as well as more check points. However, this involves the use of pattern ratios other than one-to-one (1:1) and as the Lissajous pattern ratios become higher, the problem of recognizing a check-point becomes increasingly more difficult and complex.

It is an object of the present invention to provide a novel calibration device which eliminates the problems of recognizing complex, high ratio Lissajous patterns, but at the same time retains all the desirable aspects of the standard Lissajous methods, i. e., high accuracy and a multiplicity of check points.

It is a further object of the present invention to provide a novel calibration device which will produce a signal exactly equal to the standard frequency whenever the signal to be calibrated is adjusted exactly to any detectable harmonic of the standard frequency.

It is a further object of the present invention to provide a novel calibration device which will allow one to calibrate equipment with the precision of the standard Lissajous method and at the same time with far greater speed than heretofore known.

Referring now to the drawing wherein a preferred embodiment of the novel calibration device is shown:

Figure 1 is a block diagram of the basic circuit of the present invention;

Figure 2 is a block diagram of one preferred embodiment of the invention;

Figure 3 is a circuit diagram of the preferred embodiment of the novel calibrator.

The invention, in broad terms, contemplates using a fundamental standard frequency and harmonics of this standard frequency to calibrate a variable frequency source. The fundamental is fed to some frequency indicating or comparing means. The fundamental is also fed along with harmonics of the fundamental frequency to a filter which suppresses the fundamental component. The harmonics of the fundamental frequency, which pass through this filter, are then beat with the output of the frequency source to be calibrated in a mixer or modulator. These frequencies are then fed to a filter which suppresses all frequencies above the fundamental frequency. The output of this filter is then fed to the frequency comparing means and compared in frequency with the fundamental of the standard frequency such as by applying the filter output to one set of plates of an oscilloscope, and the standard frequency to the other set of plates. Calibration check points are obtained by varying the frequency source to obtain a 1:1 Lissajous pattern from each harmonic.

Specifically referring to Figure 1, it can be seen that the frequency standard 22 generates a fundamental standard frequency $f$ and harmonic frequencies of the standard $2f$, $3f$ ... $nf$. The output of the frequency standard 22 is fed through a harmonic suppression or low pass filter 24 to an indicating means or oscilloscope 40, thus only the fundamental frequency $f$ is fed to the oscilloscope 40. The output of the frequency standard 22 is also fed to a fundamental suppression filter 28. The filter 28 suppresses the fundamental frequency $f$ and passes the harmonic frequencies $2f$, $3f$ ... $nf$. The harmonic frequencies are then fed to a balanced modulator or mixer 36 where these frequencies are beat with an unknown frequency $f_x$ generated by the variable frequency source 30 to be calibrated. As shown in detail in Figure 3, the modulator, if a modulator is used, is balanced to eliminate the $2f$, $3f$, $4f$ ... $nf$ signal from the output of the modulator. The output of the modulator 36 therefore is composed of: $f_x$, $f_x \pm 2f$, $f_x \pm 3f$ ... $f_x \pm nf$. It will be realized that whenever $f_x$ is some multiple of $f$, that is, $nf$, a zero frequency will be produced by the modulation of $f_x$ with the equivalent of $nf$ component of the harmonic signal. The modulation of the $f_x$ frequency with the $(n-1)f$ and $(n+1)f$ components, produces an output equal to $f$. Modulation of $f_x$ with the next pair, $(n\pm2)f$, produces a $2f$ output component, and so on for each harmonic. This composite signal ($f$, $2f$, $3f$ ... $nf$) is then fed to a band pass filter 38 which severely attenuates all frequencies outside the neighborhood of the standard frequency signal $f$. Therefore, it can be seen that whenever $f_x$ is some multiple of the standard $f$, the net output of the band pass filter 38 will be $f'$ which is a signal equal to $f$. However, if $f_x$ is a few cycles ($\Delta f$) higher in frequency than some multiple of $f$, then the modulation of $f_x$ will be $(n+1)f$ and $(n-1)f$ and will produce signals that are respectively lower and higher than $f$ by the same number of cycles $\Delta f$. A similar analysis applies for $(n\pm2)f$ components and so on, as well as in the case where $f_x$ is a few cycles lower in frequency than some multiple of $f$. The adjustment of the unknown $f_x$ to an exact multiple of $f$ is readily indicated by applying the output of the filter 38 to one set of the oscilloscope deflection plates and comparing it with the standard $f$ which is applied to the opposite set of deflection plates in the oscilloscope 40. This oscilloscope frequency comparison will result in the familiar stationary 1:1 Lissajous pattern of a circle, ellipse, or straight line depending on the relative magnitude and phase relationship of $f$ to $f'$ whenever $f$ and $f'$ are exactly equal. Further, it should be noted that an identical 1:1 Lissajous pattern is obtained whenever $f_x$ is a multiple of $f$. The variable frequency source 30 ordinarily is a signal generator having a calibrated dial. The particular harmonic of $f$ to which source 30 is adjusted to produce the Lissajous pattern is determined from the dial on source 30. The nearest multiple of $f$ to the dial reading on source 30 is the actual frequency output $f_x$ of source 30.

Of course, it is possible, if desired, to obtain intermediate check points by making use of Lissajous patterns with, for example, 2:1 and 3:1 ratios for points ½ and ⅓ way between the principal calibration points.

For the purposes of illustration, a block diagram of one preferred embodiment of the invention is shown in Figure 2. This diagram discloses a 1000 cycle source 10 as the basic frequency standard for accurately establishing the frequency $f$. A 1000 cycle source was selected merely because it is readily available as a stable frequency source such as crystal controlled oscillator. The 1000 cycle signal is fed into a peaking circuit 12 whose output is used to trigger a 10:1 frequency dividing multivibrator 14 which produces a 100 cycle standard signal which is the frequency standard with which the unknown frequency will be compared with by use of the oscilloscope 40. The 10:1 division was selected since check points were desired at 100 cycle intervals. The multivibrator 14 also serves as a harmonic generator to produce a 100 cycle signal. The harmonics and the 100 cycle signal are fed into a low pass filter 16 which filters out the harmonics and allows the 100 cycle standard signal to pass to the oscilloscope 40. The 100 cycle standard signal and the harmonics of this standard are also fed through the isolation stage 26 into a fundamental suppression filter 28. The fundamental suppression filter 28 suppresses the 100 cycle standard signal and allows the harmonics of this signal to pass to the balanced modulator or mixer 36. Also fed into the balanced modulator 36 is the signal from the source to be calibrated. This unknown signal is generated by the instrument to be calibrated 30, which is generally a variable frequency source. It is, of course, assumed that this instrument has a frequency dial which will indicate roughly the approximate frequency at which the instrument is operating. The unknown signal is fed through amplifier 32, if amplification is necessary, and then passed to a low frequency attenuator 34. The low frequency attenuator 34 is used to attenuate the modulator output at the lower frequency check points and thus provide a more uniform output for the entire range. The unknown signal, thus attenuated, is fed into the balanced modulator or mixer 36 to be beat with the harmonics of the 100 cycle signal. At the lower frequencies, in the audio range, it is preferable to use a balanced modulator in order to filter out any 100 cycle standard signal which may have gotten past the fundamental suppression filter 28. This filtering action is inherent in the balanced modulator operation. The resultant signals composed of the unknown frequency signal added to the sum and the difference of the harmonics of the 100 cycle standard signal are fed into a band pass filter 38 which filters out all of the resultant frequency signals above the 100 cycle frequency standard and at the same time allows those signals at and below this standard frequency to pass to the horizontal plates of the oscilloscope 40. The 100 cycle standard signal generated from the multivibrator 14 is placed as described above, on the vertical plates of the oscilloscope 40 to give a Lissajous pattern. Each of the individual components of this novel calibration device is old and well-known and forms no basis of the invention. However, their novel interrelation provides a novel and distinctive device.

To make frequency calibrations with the above described device whose circuit is disclosed in detail in Figure 3, it is necessary to obtain a standard signal whose frequency is equal to the desired calibration interval. Since a 1000 cycle signal is usually more readily available, whereas a 100 cycle signal will provide closer check points, it was found desirable in the preferred embodiment to feed a 1000 cycle signal to a 10:1 frequency dividing multivibrator 14 to obtain a 100 cycle signal for the standard $f$. The multivibrator 14, having an output rich in harmonics, serves the dual function of a frequency divider and a harmonic generator. The 1000 cycle standard frequency signal is fed to multivibrator 14 through a peaking circuit 12 to provide a more positive locking action of the multivibrator 14. An isolation stage 26 is used to prevent overcoupling and to isolate the multivibrator 14 from the balanced modulator 36 and signals in that portion of the circuit. Multivibrator 14 is a free-running multivibrator which is simply a two stage resistance-capacitance-coupled amplifier with the output of the second stage coupled through a capacitor to the grid of the first tube. Since the signal applied to the grid of a resistance-capacitance-coupled amplifier is reversed in phase in the output, the output of the second stage is in phase with the input to the first stage, as each stage reverses the polarity of its input. Because the output of the second stage is of the proper polarity to reinforce the signal applied to the first tube, oscillations take place. The potentiometers are merely in the circuit to adjust the voltages as the tubes age. The 100 cycle signal, $f$, and its harmonics are fed directly from the multivibrator 14 output through the low pass filter 16, which is a two section T filter, on to one set of plates of the oscilloscope 40. The low pass filter 16 is used to suppress the harmonics and to obtain a signal having a relatively sinusoidal characteristic, which produces the best comparison. The 100 cycle signal and its harmonics are also fed into the suppression filter 28. This suppression filter 28, which is a parallel-T filter, suppresses the 100 cycle signal and passes the remaining components, namely, the 200, 300, 400 ... $n(100)$ cycles. These components then pass to the balanced modulator 36, which is a conventional cathode-modulator system. The output $f_x$ of the instrument to be calibrated 30 is fed through a tuned low-frequency attenuator 34 and then also applied to the modulator 36. The attenuator 34 which is used, in this particular application, is a one section T filter. The modulator output signal consists of the following components: $f_x$, $f_x \pm 200$; $f_x \pm 300$; ... $f_x \pm n(100)$ C. P. S.

This output is then fed through the band pass filter 38 which consists of a low pass filter and two parallel-T filters. The signal from the output of this filter, which may be called $f'$, is placed upon another set of plates of the oscilloscope 40.

Now, if $f_x$ differs from the exact multiple value $n(100)$ by several cycles per second, then the filter output $f'$ also differs from 100 C. P. S. by an identical amount. Consequently, $f_x$ can be exactly set to any multiple of 100 C. P. S. by merely adjusting $f_x$ until $f'$ is exactly 100 C. P. S. This condition is readily indicated on the oscilloscope 40 by a stationary 1:1 Lissajous pattern.

Thus, it can be seen by the novel interconnection of several common elements of electronic-circuit networks a novel harmonically related frequency comparison device is produced. This device provides equally spaced frequency-calibration points at all detectable multiples of a base or calibrating interval frequency. Further, it uses the precision of the Lissajous method and at the same time provides a 1:1 pattern at all check points. Lastly, no circuit switching is required to obtain calibration over the entire useable range of measurement.

From the foregoing description of the present invention, it is apparent that considerable modification of the features thereof is possible without exceeding the scope of the invention which is defined in the appended claims.

The invention described herein may be manufactured and used by or for the Government of the United States of America for governmental purposes without the payment of any royalties thereon or therefor.

What is claimed is:

1. A frequency calibration device comprising in combination, a frequency comparing means, a mixer, a standard frequency source for producing a fundamental and harmonics thereof, means for introducing said fundamental into said frequency comparing means, means for introducing said harmonics into said mixer, a variable frequency source having a calibrated frequency control dial, means connecting said variable frequency source to said mixer, said connecting means being adapted to apply said variable frequency to said mixer without substantially altering its harmonic content, and means for introducing only the frequency output components of said mixer at said fundamental and below into said frequency comparing means.

2. A frequency calibration device comprising in combination, a frequency comparing means, a mixer, a standard frequency source for producing a fundamental and harmonics thereof, means for introducing said fundamental into said frequency comparing means, means including a suppression filter for introducing said harmonics into said mixer and suppressing said fundamental frequency, a variable frequency source having a calibrated frequency control dial, means connecting said variable frequency source to said mixer, said connecting means being adapted to apply said variable frequency to said mixer without substantially altering its harmonic content, and means for introducing only the frequency output components of said mixer at said fundamental and below into said frequency comparing means.

3. A frequency calibration device comprising in combination, a frequency comparing means, a modulator, a standard frequency source producing a fundamental and harmonics thereof, means for introducing said fundamental into said frequency comparing means, means for introducing said harmonics into said modulator, a variable frequency source having a calibrated frequency control dial, means connecting said variable frequency source to said modulator, said connecting means being adapted to apply said variable frequency to said modulator without substantially altering its harmonic content, and a filter that will pass all signals of the fundamental frequency and below for introducing the frequency output components of said modulator at said fundamental and below into said frequency comparing means.

4. A frequency calibration device comprising in combination, an oscilloscope, a modulator, a standard frequency source producing a fundamental and harmonics thereof, means for introducing said fundamental into said oscilloscope, means for introducing said harmonics into said modulator, a variable frequency source having a calibrated frequency control dial, means connecting said variable frequency source to said modulator, and means for introducing only the frequency output components of said modulator at said fundamental and below into said oscilloscope.

5. A frequency calibration device comprising in combination, an oscilloscope, a modulator, a standard frequency source producing a fundamental and harmonics thereof, means for introducing said fundamental into said oscilloscope, a suppression filter for introducing said harmonics into said modulator, a variable frequency source, means connecting said variable frequency source to said modulator, and means for suppressing the frequency output components of said modulator above said fundamental and introducing the remaining frequency output components of said modulator into said oscilloscope.

6. A frequency calibration device comprising in combination, an oscilloscope, a modulator, a standard frequency source producing a fundamental and harmonics thereof, means for introducing said fundamental into said oscilloscope, means for introducing said harmonics into said modulator, a variable frequency source having a calibrated frequency control dial, means connecting said variable frequency source to said modulator, and a filter for suppressing the frequency output components of said modulator above said fundamental and introducing the remaining frequency output components of said modulator into said oscilloscope.

7. A frequency calibration device comprising in combination, an oscilloscope, a balanced modulator, a standard frequency source producing a fundamental and harmonics thereof, means for introducing said fundamental into said oscilloscope, a filter for introducing said harmonics into said balanced modulator, a variable frequency source having a calibrated frequency control dial, means connecting said variable frequency source to said balanced modulator, said connecting means being adapted to apply said variable frequency to said mixer without substantially altering its harmonic content, and a filter for suppressing the frequency output components of said balanced modulator above said fundamental and introducing the remaining frequency output components of said balanced modulator into said oscilloscope.

8. In a frequency calibration device comprising in combination, a frequency comparing means, a mixer, a multivibrator producing a fundamental and harmonics thereof, means for introducing said fundamental into said frequency comparing means, means for introducing said harmonics into said mixer, a variable frequency source having a calibrated frequency control dial, means connecting said variable frequency source to said mixer, said connecting means being adapted to apply said variable frequency to said mixer without substantially altering its harmonic content, and means for introducing only the frequency output components of said mixer at said fundamental and below into said frequency comparing means.

9. In a frequency calibration device comprising in combination, a frequency comparing means, a modulator, a multivibrator producing a fundamental and harmonics thereof, a low pass filter for introducing said fundamental into said frequency comparing means, a filter for introducing said harmonics into said modulator, a variable frequency source having a calibrated frequency control dial, means connecting said variable frequency source to said modulator, said connecting means being adapted to apply said variable frequency to said modulator without substantially altering its harmonic content, and means for introducing only the frequency output components of said modulator at said fundamental and below into said frequency comparing means.

10. In a frequency calibration device comprising in combination, a frequency comparing means, a modulator, a multivibrator producing a fundamental and harmonics thereof, an isolation stage between said multivibrator and said modulator, a low pass filter for introducing said fundamental into said frequency comparing means, a filter for introducing said harmonics into said modulator, a variable frequency source having a calibrated frequency control dial, means connecting said variable frequency source to said modulator, said connecting means being adapted to apply said variable frequency to said modulator without substantially altering its harmonic content, and means for introducing only the frequency output components of said modulator at said fundamental and below into said frequency comparing means.

11. In a frequency calibration device comprising in combination, an oscilloscope, a balanced modulator, a multivibrator producing a fundamental and harmonics thereof, an isolation stage between said multivibrator and said balanced modulator, a low pass filter for introducing said fundamental into said oscilloscope, a filter for introducing said harmonics into said balanced modulator, a variable frequency source having a calibrated frequency control dial, means including a low frequency attenuator connecting said variable frequency source to said balanced modulator, and means for suppressing the frequency output components of said balanced modulator above said fundamental and introducing the remaining frequency output components of said balanced modulator into said oscilloscope.

12. In a frequency calibration device comprising in combination, an oscilloscope, a balanced modulator, a multivibrator producing a fundamental and harmonics thereof, an isolation stage between said multivibrator and said balanced modulator, a low pass filter for introducing said fundamental into said oscilloscope, a filter for introducing said harmonics into said balanced modulator, a variable frequency source having a calibrated frequency control dial, means including a low frequency attenuator connecting said variable frequency source to said balanced modulator, and a filter for suppressing the frequency output components of said balanced modulator which are above said fundamental, and means for introducing the remaining frequency output components of said balanced modulator into said oscilloscope.

References Cited in the file of this patent

UNITED STATES PATENTS

| | | |
|---|---|---|
| 2,321,315 | Peterson | June 8, 1943 |
| 2,380,868 | Peterson | July 31, 1945 |
| 2,423,103 | Koechlin | July 1, 1947 |
| 2,476,840 | Colander | July 19, 1949 |
| 2,537,104 | Taylor | Jan. 9, 1951 |
| 2,629,829 | Daly | Feb. 24, 1953 |

OTHER REFERENCES

"Production-Line Frequency Measurements," by Kent, Electronics Magazine, February 1951, pages 97 to 99.